June 11, 1929.　　　　J. B. ICRE　　　　1,716,891
APPARATUS FOR BAKING FLAT PIECES OF BREAD AND THE LIKE
Filed July 22, 1927
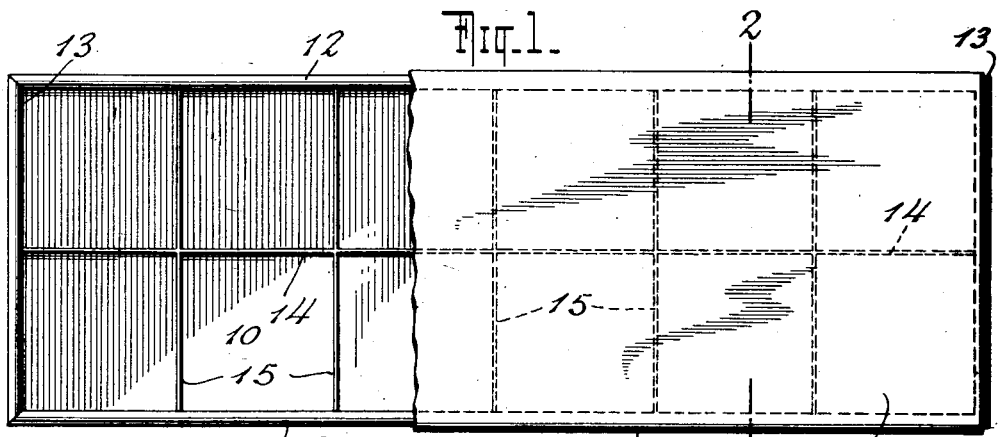
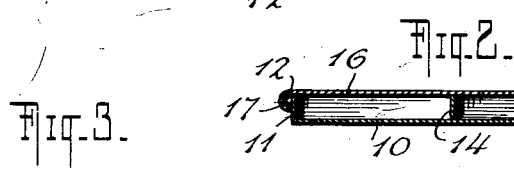
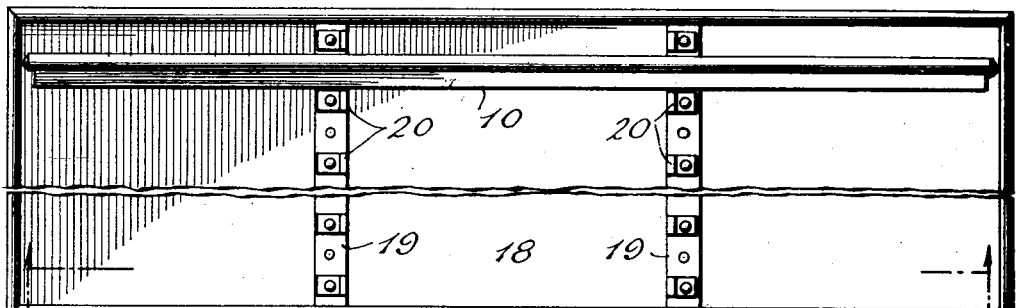
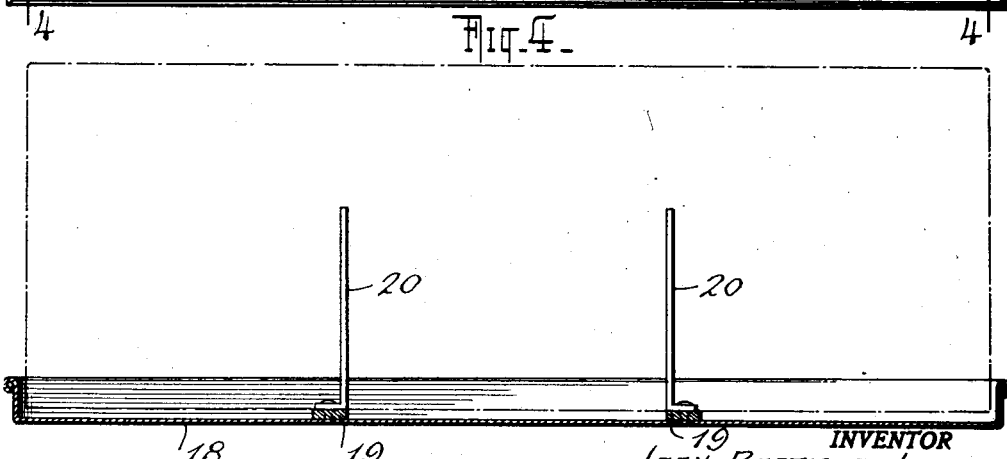
INVENTOR
JEAN BAPTISTE ICRE
BY
ATTORNEYS Patented June 11, 1929.

1,716,891

UNITED STATES PATENT OFFICE.

JEAN BAPTISTE ICRE, OF NEW YORK, N. Y.

APPARATUS FOR BAKING FLAT PIECES OF BREAD AND THE LIKE.

Application filed July 22, 1927. Serial No. 207,616.

My present invention relates to the baking of bread and the like, and has for its object more particularly the production of flat pieces or slices such as are suitable for the making of sandwiches. The advantages of my improvements consist in the possibility of baking a large number of such flat pieces at the same time, in a uniform manner, and in a better utilization of the area of the baking oven, so that with the same floor space a much greater output can be obtained when proceeding in accordance with my invention than when following the practice common hitherto.

An apparatus suitable for carrying out my present invention is shown, by way of example, in the accompanying drawings, in which Fig. 1 is a plan view of a dough-receiving pan or box employed by me, with parts broken away; Fig. 2 is a section on line 2—2 of Fig. 1; Fig. 3 is a plan view of a base or holder for a plurality of pans such as shown in Figs. 1 and 2; and Fig. 4 is a vertical section on line 4—4 of Fig. 3.

The pan shown in detail in Figs. 1 and 2 has a bottom 10, longitudinal side walls 11 provided with beads 12 at their upper or free edges, transverse side or rather end walls 13, a longitudinal partition 14, and a plurality of transverse partitions 15. These partitions 14, 15 form a plurality of chambers or compartments of the size of an ordinary sandwich, say about four inches square, and of a depth which may be equal to the aggregate thickness of the two slices of a sandwich, say one half inch. In conjunction with this pan, I employ a cover 16 having longitudinal flanges 17 adapted to fit exteriorly on the beads 12, said cover being of a shape and size corresponding to those of the bottom 10, so that by sliding the cover along the beads 12 the pan can be closed entirely.

The cover 16 having been removed from the pan, the compartments of the pan are filled with a suitable dough, the bottom 10 being at that time horizontal or approximately so. Thereupon the cover 16 is slipped on and slid to the closing position. This operation is repeated with a number of pans or boxes, which are then inserted, in the manner to be explained presently, in a holder of the character illustrated by Figs. 3 and 4.

The said holder comprises a board, pan, or other suitable base 18, on the upper surface of which are riveted or otherwise secured transverse (preferably parallel) bars 19 forming supports on which one longitudinal wall 11 of each of the boxes or pans is adapted to rest, the said pans or boxes being thus set on edge, with the bottom 10 of each in a substantially vertical position. The individual pans or boxes are fitted between parallel angle irons 20 secured to the bars 19 in proper relative position or registry. The distance between adjacent angle irons or guide pieces 20 is just enough greater than the thickness of one of the boxes (pan with cover) to allow such box to be inserted and removed without difficulty. The height of these guide pieces 20 is preferably about such as to reach to the central portion of the boxes, or in other words, to the level of the longitudinal partitions 14; I do not, however, restrict myself to this specific arrangement. The distance between the supporting bars 19 is preferably considerably less than the length of the dough-receiving boxes, so that the ends of these boxes will project beyond said bars, or overhang, as shown best in Fig. 4.

The holder with the boxes set thereon edgewise is placed in a baking oven of any well-known or approved construction, and exposed to the heat thereof in substantially the usual manner. It will be noted, however, that the dough is baked in portions that are relatively thin, so that the heat can penetrate readily into the interior of each of the dough portions contained in the compartments of the individual pans, and thus the baking process will proceed much more uniformly than when applied to relatively thick portions of dough, as in the usual baking of bread in loaves. The resulting pieces or slices are therefore much more palatable and otherwise satisfactory than slices cut from loaves. The edgewise arrangement of the pans during the baking operation facilitates the circulation of the heat, as the large surfaces of the pans are substantially vertical and therefore promote the upward travel of the hot gases or air rather than impede it, as is the case when the air or gases are trapped or held down by large substantially horizontal surfaces. The baking operation will therefore be more thorough and quicker with my invention, and the bread slices obtained will be uniform in quality, and more wholesome than bread the interior of which is baked considerably less than its outer portions. It will furthermore be obvious from a consideration of the drawings that a great economy of floor space is obtained with my edgewise arrangement of the pans during baking, and that a very much larger number of such bread slices can be baked, on a given unit of floor space, when they are set edgewise as described, than if they were baked flat, with the bottom 10 horizontal.

The slices produced may be twice as thick as ordinary sandwich slices, and in such case they would be cut in half, after baking, to slices of the same size, but only half the thickness, the plane of the cut being about midway between the top and bottom surfaces of the piece or slice. This additional cutting operation may be avoided by placing within each compartment of the pan, before baking, two portions or batches of dough, one above the other, and each having a thickness of about half the depth of the pan. To prevent these two portions from coalescing or sticking together during the baking operation, any suitable means may be employed, for instance the adjacent surfaces of the two portions may be greased. If preferred, the pans might be made shallower, so that each compartment will hold a dough portion of the thickness of a single slice such as used for sandwiches.

Various modifications may be made without departing from the nature of my invention as set forth in the appended claims.

I claim:—

1. An apparatus for baking flat pieces of bread and the like, comprising pans each divided into a plurality of compartments for containing portions of dough and molding them to individual, flat form, a cover slidably connected with each pan for confining the dough portions therein, a holder, and upright guide pieces on said holder for supporting a plurality of pans edgewise thereon in spaced relation whereby said portions of dough are held in upright positions with the major flat surfaces thereof upright so that the ascending heat developed during the baking operation is caused to travel along said flat surfaces.

2. An apparatus for baking flat pieces of bread and the like, comprising pans each divided into a plurality of compartments for containing portions of dough and molding them to individual, flat form, a cover movably connected with each pan for confining the dough portions therein, a holder, and spaced guide pieces projecting upwardly from said holder for maintaining a plurality of said pans edgewise on said holder in spaced relation whereby said portions of dough are held in upright positions with the major flat surfaces thereof upright so that the ascending heat developed during the baking operation is caused to travel along said flat surfaces.

3. An apparatus for baking flat pieces of bread and the like, comprising pans each divided into a plurality of compartments for containing portions of dough and molding them to individual, flat form, a cover movably connected with each pan for confining the dough portions therein, a holder provided with spaced bars secured to the inner surface of its bottom and projecting therefrom to support a plurality of said pans out of contact with such bottom, and spaced guide pieces projecting upwardly from said bars to maintain the said pans edgewise on the holder in spaced relation whereby said portions of dough are held in upright position with the major flat surfaces thereof upright so that the ascending heat developed during the baking operation is caused to travel along said flat surfaces.

In testimony whereof I have hereunto set my hand·

JEAN BAPTISTE ICRE.